United States Patent Office 3,581,359
Patented June 1, 1971

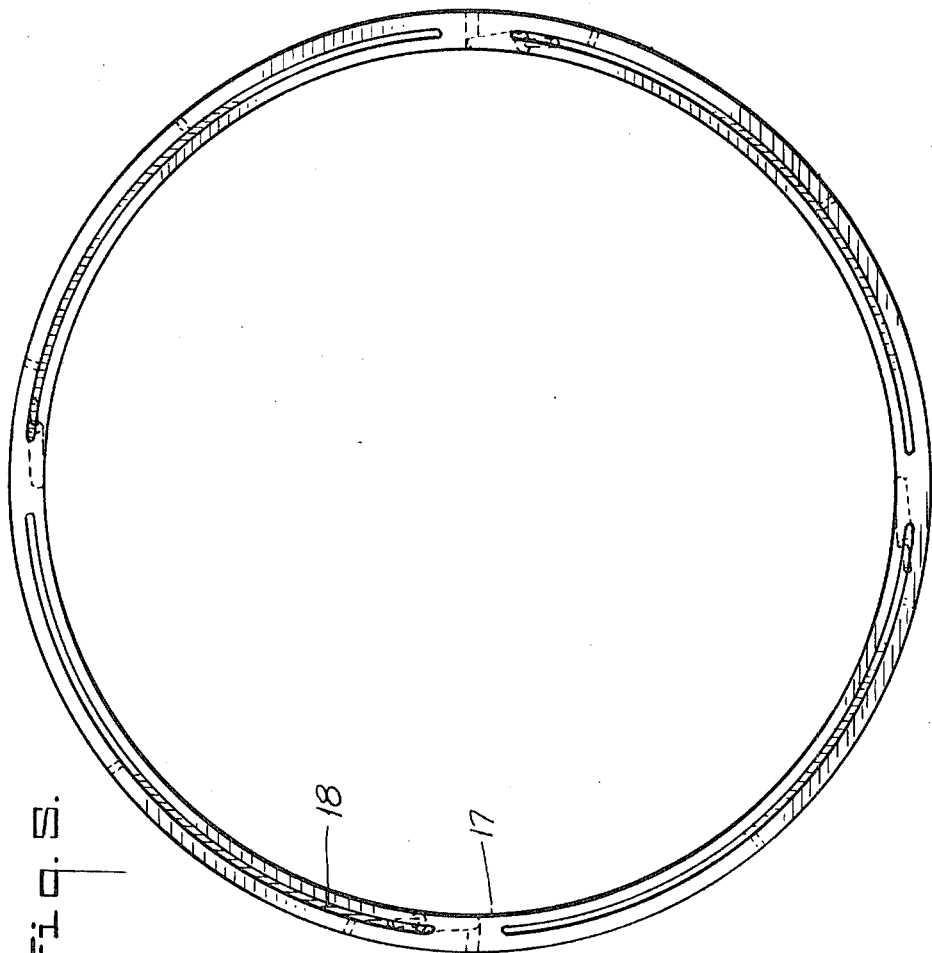
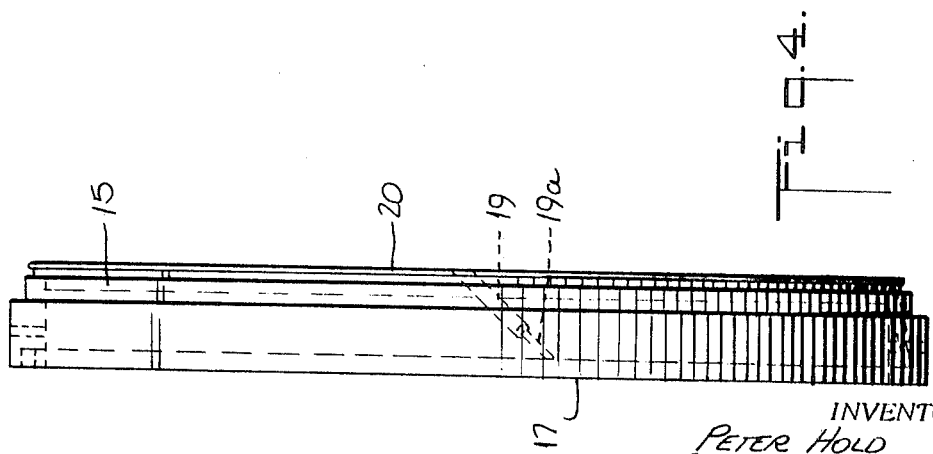

---

3,581,359
HYDROSTATIC BEARING TYPE SEAL FOR A CONTROLLED DEFLECTION ROLL
Samuel S. Board, Jr., Woodbridge, George R. Cournoyer, Huntington, and Peter Hold, Milford, Conn., assignors to USM Corporation, Boston, Mass.
Filed June 3, 1969, Ser. No. 829,930
Int. Cl. B21b 13/02
U.S. Cl. 29—116                                  5 Claims

ABSTRACT OF THE DISCLOSURE

A controlled deflection roll has a non-rotative shaft and a superimposed roll shell with radial space between the two. End and axially extending seals are connected to the shaft and bear against the inside of the roll shell to divide the space into two compartments, into one of which liquid is introduced under pressure so that when the roll shell is working against a counter roll under pressure, the deflection of the roll shell is controlled by the pressure on the liquid with consequent opposite beam deflection of the shaft. One or more of these seals, and preferably all of them, is formed by a piston which reciprocates in a recess in the shaft to and from the inside of the roll, this piston having an outer surface facing this inside and in which a recess is formed to form a hydrostatic bearing pad cooperating with the inside of the roll, this inside forming what is in effect a hydrostatic bearing runner. There is a fluid connection between this recess and the back of the piston and a source of fluid under pressure is connected to the recess through a flow restrictor so that the piston forms a seal acting like a hydrostatic bearing. The source of sealing pressure may be separate from that supplying the roll deflection pressure, either in the sense of being literally a separate source or a source working through a pressure controlling system, whereby the sealing pressure may be varied independently of the roll deflection controlling pressure.

---

This invention relates to controlled deflection rolls of the kind disclosed by the U.S. Appenzeller Pat. 2,908,964, dated Oct. 20, 1959.

Such a roll has a non-rotative shaft with a roll shell superimposed thereabout with a radial space formed between the inside of the roll shell and the shaft. End and longitudinally extending seals divide this space into compartments, one of which is opposite a counter roll which cooperates with the roll shell to form a nip through which work to be pressure rolled may be passed. The work may consist of a paper or textile web to be calendered, for example.

Ordinarily, the pressure of rolling work between a roll and counter roll tends to cause the rolls to flex like beams, or deflect, because their ends are supported by frames or the like which hold the rolls together on the work. Such a deflection causes non-uniform pressure on the work. But with a controlled deflection roll, the introduction of fluid, usually liquid, under pressure into the compartment on the side towards the counter roll controls the deflection of the roll shell to permit more uniform pressure on the work.

The seals required to separate these compartments project from the shaft and bear against the inner wall of the roll shell. The design may be such so that the sealing pressure is constant or increases and decreases with such higher and lower pressures as may be required on the fluid in the compartment controlling the deflection of the roll. However, at times the sealing pressure is higher than is needed and at all times there is frictional drag between the seals and the inside of the roll which results in power loss and seal wear.

As a brief summary of the present invention, one or more, preferably all, of the above seals are formed by a piston having a length extending for the extent required by this seal. The piston is relatively narrow in width so that, particularly in the case of an axial seal, it is longitudinally flexible. The non-rotative shaft has a correspondingly shaped recess in which this piston reciprocates to and from the inside of the roll, and the piston has an outer surface facing the roll's inside and in which a recess is formed to form a hydrostatic bearing pad cooperating with the inside of the roll with this inside forming a hydrostatic bearing runner. There is a fluid connection between the recess and the backside of the piston and therefore when a source of fluid under pressure is connected to the recess through a fluid flow restrictor, the fluid under pressure acts on the back of the piston and, through the fluid connection, on the outer surface of the piston through the recess formed in the latter. Thus a hydrostatic bearing effect is obtained with the fluid acting on the back of the piston pressing the piston against the inside of the roll and with the outer surface of the piston held from direct contact with the inside of the roll by the flow of fluid. The piston or sealing pressure is dependent on the ratio of the piston areas of the back of the piston and its front end. By making the latter with the greater piston area, the piston floats on the fluid between it and the inside of the roll.

A specific example of the above is illustrated by accompanying drawings in which:

FIG. 4 is a side view of the right-hand end seal shown by FIG. 1; and

FIG. 5 is a front view of the end seal shown by FIG. 4.

Figure 1:
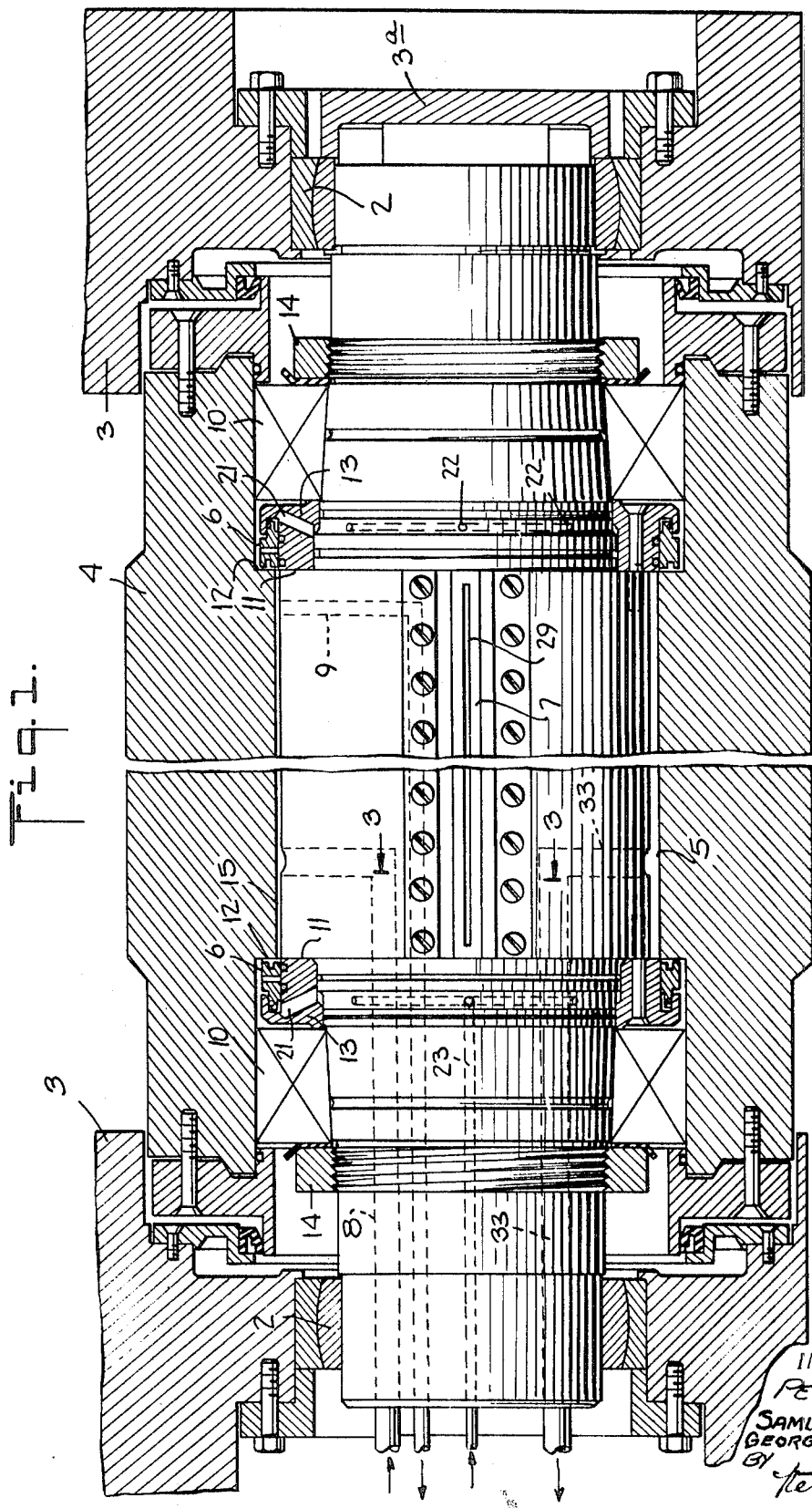
FIG. 1 is a longitudinal vertical section of a controlled deflection roll of the kind described, the stationary shaft being in elevation, the shaft having axial and end seals with the latter shown in cross section.

As shown by FIG. 1, the non-rotative shaft 1 has its opposite ends each supported in rocking bearings 2 mounted by side frames 3 of the machine using the roll. The shaft is held against rotation by a flexible connection with an end cap 3a fixed to the right-hand frame. The roll shell 4 is superimposed on the shaft 1 with a radial space 5 therebetween. This radial space is sealed at its opposite ends by end seals 6 and axially extending seals 7 so as to divide the space 5 into two compartments.

The machine frames 3, although not shown, of course journal rotatively a counter roll which works opposite the outer periphery of the roll shell 4 so that work can be pressure rolled between the two rolls. The roll pressure ordinarily would cause deflection of the roll shell 4 if the latter where simply journaled rotatively at its ends.

To prevent or control such deflection and assuming that the counter roll is above the roll shell 4, fluid under pressure, from a suitable source not shown, may be introduced to the compartment above the axial seals 7. This is schematically shown as being done by a passage 8 formed through the shaft 1 and leading into the upper space 5 of the compartment defined above the axial seal 7. Incidentally, although in FIG. 1 only the axial seal facing the observer is illustrated there is of course a corresponding seal diametrically opposite on the other side of the shaft 1.

Ordinarily, the pressure maintained in the upper compartment is established by a moving flow of liquid, the exhaust from the upper compartment being through a passage 9 formed in the shaft 1, the system being of course under control to establish the pressure necessary in the upper compartment.

The pressure in the upper compartment is regulated to hold the roll shell 4 against deflection or to over or under crown the roll shell to the degree desired for the rolling operation being conducted, the reaction being transmitted to the shaft 1 with consequent downward beam deflection of the latter. It is for this reason that the shaft ends are mounted by the rocker bearings 2 and that if bearings are used between the shaft and the ends of the roll shell, as indicated at 10, these bearings must be of the self-aligning type.

It is with the seals 6 and 7 with which the present invention is particularly concerned.

As shown by FIG. 1, the portion of the shaft 1 which defines the opposite ends of the compartments previously described has at each of its ends an outwardly extending radial shoulder 11, while for the corresponding portion the roll shell 4 has at each end an inwardly extending radial shoulder 12. In each instance the shoulders are in radial alignment with each other.

It is at these ends that the end seals defining the two compartments are located. In each instance, an annular shaft member 13 abuts and is attached to shoulder 11 of the shaft. The adjacent bearing 10 is held inwardly against the member 13 by a ring nut 14 screwed on the adjacent end portion of the shaft 1.

Figure 2:
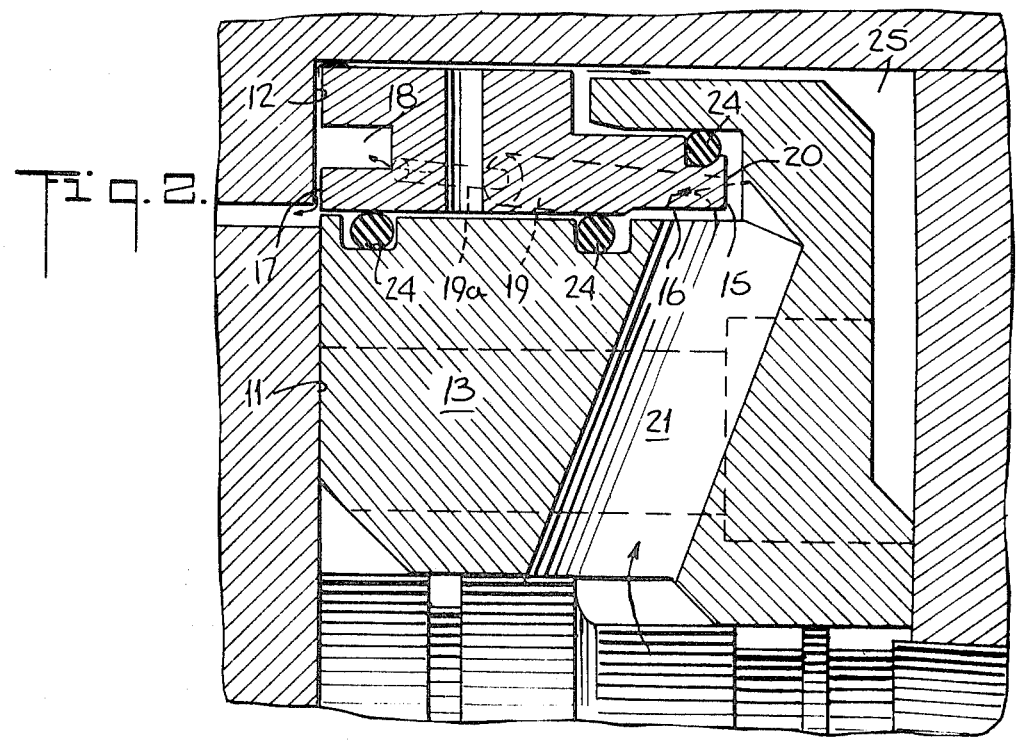
FIG. 2 is an enlargement of the upper right-hand cross section of the end seal shown by FIG. 1.

Referring now to FIG. 2 because of its enlarged scale, in each instance the annular member 13 provides the shaft 1 with an annular recess 15 which in this instance is formed in the annular member 13 in which the corresponding annular piston 16 reciprocates. This piston is relatively narrow in width because of the limited space available in this instance and it reciprocates to and from the inside of the radial shoulder 12 of the roll shell 4. This piston has an outer surface 17 facing the inside of the roll shell shoulder 12 and in which a recess 18 is formed. This recess functions as a hydrostatic bearing pad cooperating with the inside of the roll shell shoulder 12, the latter forming a hydrostatic bearing runner. A fluid connection 19 is formed between the recess 15 and the back surface 20 of the annular piston 16. A source of fluid under pressure may be connected to the recess 15 because the annular member 13 has radial holes 21 which, as shown by FIG. 1, connect through an annular series of radial holes 22 formed in the shaft 1 with an axial extending passage 23 also formed through the shaft 1. Each of the holes 19 has a portion 19a of reduced diameter forming a flow restrictor through which fluid flows to the recess to act on the back of the piston 21 and thus through 19 and 19a on the outer or front surface 17 of the piston 16. Annular O-rings 24 are located to seal the back of the piston 16 fluid tightly while permitting the piston to reciprocate in the recess 15.

The fluid under pressure is applied to the back 21 of the piston 16 to provide a forward urging force. The front 17 of the piston has a larger piston area and for any given pressure the sealing pressure is established by a ratio between these two piston areas. There is no metal-to-metal contact between the seal and the roll shell. The seal floats on an oil film in the manner typical of a hydrostatic bearing, the operation of which is well known and need not be described in detail at the present time. Because the pressure supplied to the piston seal is independent of the pressure used to control the deflection of the roll, the sealing pressure may be varied independently. The sealing pressure is normally greater than that of the pressure used to control the roll deflection so the flow is from the seal into the upper compartment of the roll assembly. This does not interfere with the control of the roll deflection controlling pressure because the latter is automatically controlled in the usual fashion. The flow laterally outwardly from the seal goes backwards or outwardly to an annular compartment 25 which may be drained by a suitable passage which may be provided in any convenient way and is therefore not illustrated.

Figure 3:
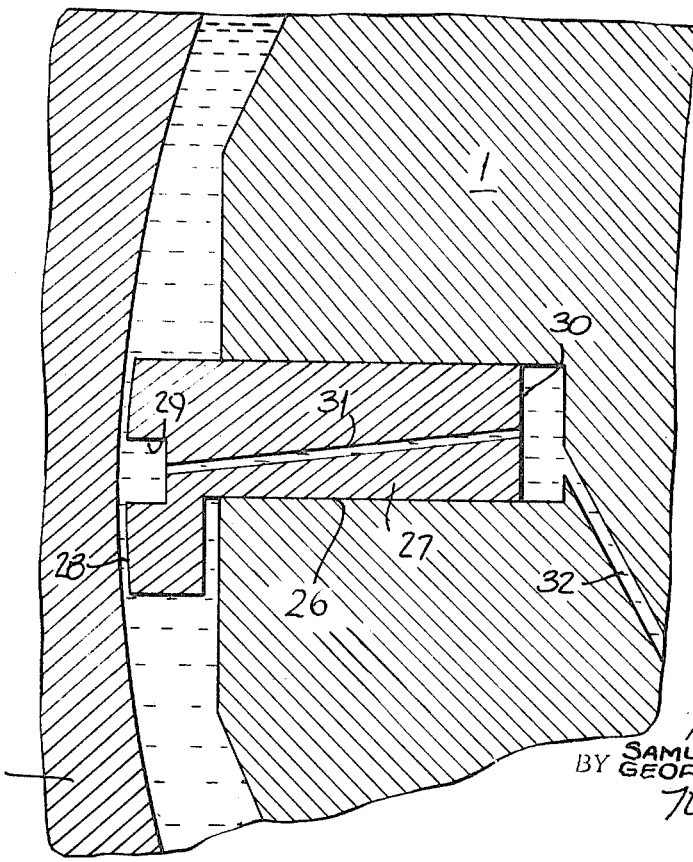
FIG. 3 is a cross section of the axial seal shown by FIG. 1, taken on the line 3—3 of this figure.

The same principles are applied in the case of the axial seals 7. Thus, as shown in FIG. 3, the shaft 1 for each seal has a longitudinally extending recess 26 in which the longitudinally extending piston 27 reciprocates to and from the cylindrical inside of the roll shell 4. The piston has an outer surface 28 facing the inside of the roll shell and in which a longitudinally extending recess 29 is formed to form a hydrostatic bearing pad cooperating with the roll shell's inside. The latter forms the hydrostatic bearing runner. The fluid connection between the recess 29 and the back 30 of the piston 27 is shown as one or more passages 31 extending laterally through the piston 27 and in this instance the entire passage 31 is of restricted diameter to form the necessary flow restrictor. The source of fluid under pressure may be connected to the recess 26 to act on the back 30 of the piston 27, by way of passages 32 formed in the shaft 1 radially and connecting with the axially extending passage 23 which also supplies the sealing pressure for the annular end seals.

In the case of these axial seals the action previously described also prevails. However, it is to be noted that in this instance the longitudinally or axially extending pistons must be of relatively narrow width to provide them with the necessary flexibility to flex with the beam flexure of the shaft, previously described, without excessive binding in the recesses 26 which act as cylinders.

In operation the flow of fluid which maintains the longitudinal seals from metal-to-metal contact with the inside of the roll shell goes upwardly into the upper compartment where the fluid pressure is low and downwardly into the lower compartment which provides space to accommodate the beam flexure of the shaft 1. This lower compartment thus becomes filled with fluid from the hydrostatic bearing type longitudinal or axial seals but pressure in the lower compartment is prevented from building-up because the lower compartment is drained or discharged freely by way of a passage 33 formed in the shaft 1.

In this instance also the piston areas of the surface 28 is substantially larger than the piston area of the surface 30.

Although the action of a hydrostatic bearing is, in general, well understood, the action is briefly described below.

In the case of either the end or axial seals, metal-to-metal contact is prevented because of the larger front piston area. If the piston seal moves closer to the runner provided by the roll shell, the pressure in the recess 29 increases so that the piston seal moves from the runner. As the piston moves from the runner, the flow separating the two metal surfaces increases and because of the flow restrictor in series with the sealing pressure flow the pressure in the recess or bearing pad decreases. The pressure on the back of the piston seal remains the same and constantly urges the sealing piston towards the runner provided by the inside of the roll shell. Thus the piston seal floats in a state of equilibrium.

It is apparent that the present invention provides for a true hydrostatic bearing type seal for sealing the compartment of a controlled deflection roll to permit use of the roll deflection controlling pressure while avoiding any mechanical intercontact between the seals and the roll.

What is claimed is:

1. A controlled deflection roll including a non-rotative shaft, a roll shell superimposed thereon with radial space therebetween and end and axially extending seals connected to said shaft and bearing against the inside of said roll and dividing said space into two compartments into one of which fluid is introduced under pressure from a source of fluid pressure to control the deflection of said roll when it receives deflection force and resulting in opposite deflection of said shaft; wherein one or more of said seals is formed by a piston having a length extending for the extent required by this seal, said piston being relatively narrow in width, said shaft having a corresponding shaped recess in which said piston reciprocates to and from the inside of said roll, said piston having an outer surface facing said inside and in which a recess is formed to form a hydrostatic bearing pad cooperating with the inside of said roll with said inside forming a hydrostatic bearing runner, a fluid connection between said piston recess and the back surface of said piston, means for connecting a source of fluid under pressure to said shaft recess, and a flow restrictor through which fluid from the last-named source flows to said piston recess to act on the back of said piston and, through said fluid connection, on said outer surface of said piston through said recess.

2. The roll of claim 1 in which said piston's outer surface has a piston area greater than its said back surface.

3. The roll of claim 1 in which said piston and said recess are linear and said piston forms one of said axially extending seals, said piston being longitudinally flexible so it can flex with deflection of said shaft.

4. The roll of claim 1 in which said shaft has a radial shoulder and said piston and said recess are annular and the latter is formed in said radial shoulder of said shaft, said roll having an annular shoulder against which said outer surface of said annular piston cooperates.

5. The roll of claim 1 in which said sources of fluid pressure are independent from each other.

References Cited

UNITED STATES PATENTS

| | | | |
|---|---|---|---|
| 2,908,964 | 10/1959 | Appenzeller | 29—116AD |
| 3,196,520 | 7/1965 | Appenzeller | 29—116AD |
| 3,430,319 | 3/1969 | Skaugen | 29—116AD |
| 3,443,295 | 5/1969 | Denoyer et al. | 29—116AD |
| 3,481,016 | 12/1969 | Cournoyer et al. | 29—116AD |
| 3,494,675 | 2/1970 | Hold et al. | 29—116AD |

ALFRED R. GUEST, Primary Examiner